(12) United States Patent
Yoshida et al.

(10) Patent No.: US 6,816,446 B2
(45) Date of Patent: Nov. 9, 2004

(54) OPTICAL RECORDING APPARATUS AND METHOD FOR DISPLAYING RESIDUAL SPACE ON OPTICAL RECORDING MEDIUM

(75) Inventors: Chisato Yoshida, Saitama (JP); Fumihiko Kaise, Tokyo (JP)

(73) Assignee: Sony Corporation (JP)

( * ) Notice: Subject to any disclaimer, the term of this patent is extended or adjusted under 35 U.S.C. 154(b) by 353 days.

(21) Appl. No.: 09/878,703

(22) Filed: Jun. 11, 2001

(65) Prior Publication Data

US 2002/0015370 A1 Feb. 7, 2002

(30) Foreign Application Priority Data

Jun. 12, 2000 (JP) ................................ P2000-175886

(51) Int. Cl.[7] .............................................. G11B 27/24
(52) U.S. Cl. ................... 369/53.24; 369/59.25; 369/83; 369/53.37
(58) Field of Search ........................ 369/53.24, 53.2, 369/47.15, 124.08, 53.37, 84, 83, 30.05, 59.25, 44.13, 44.26, 275.3; 710/74; 711/173; 713/100; 358/453

(56) References Cited

U.S. PATENT DOCUMENTS

| | | | |
|---|---|---|---|
| 4,746,993 A | | 5/1988 | Tada |
| 5,159,670 A | * | 10/1992 | Suzuki et al. ................ 345/467 |
| 5,652,863 A | * | 7/1997 | Asensio et al. .............. 711/173 |
| 5,778,257 A | * | 7/1998 | Tsukatani et al. ............. 710/74 |
| 5,825,726 A | * | 10/1998 | Hwang et al. ........... 369/30.05 |
| 6,005,679 A | * | 12/1999 | Haneda ...................... 358/453 |
| 6,091,686 A | * | 7/2000 | Caffarelli et al. ......... 369/53.24 |
| 6,198,708 B1 | * | 3/2001 | Suzuki .................... 369/53.37 |
| 6,226,241 B1 | * | 5/2001 | D'Amato et al. ........ 369/47.15 |
| 6,370,096 B1 | * | 4/2002 | Hashimoto ................. 369/53.2 |
| 6,483,787 B1 | * | 11/2002 | Sugasawa et al. ....... 369/44.13 |

FOREIGN PATENT DOCUMENTS

| | | |
|---|---|---|
| EP | 0 929 072 A2 | 7/1999 |
| WO | WO 99/03101 A1 | 1/1999 |
| WO | WO 00/02195 A2 | 1/2000 |

* cited by examiner

*Primary Examiner*—A. J. Heinz
*Assistant Examiner*—Kim-Kwok Chu
(74) *Attorney, Agent, or Firm*—Lerner, David, Littenberg, Krumholz & Mentlik, LLP

(57) ABSTRACT

An optical recording apparatus includes a CD-R drive which writes data to a CD-R. A close session processor performs session closing in order to enable a CD-ROM drive, which is only capable of reading data, to read information written to the CD-R. An LCD panel displays information concerning session closing performed by the close session processor. A control unit causes the LCD panel to display the information concerning session closing based on whether session closing has been performed by the close session processor.

9 Claims, 13 Drawing Sheets

FIG. 7

| FRAME NO. | CONTENTS OF FRAME |
|---|---|
| N | SPECIAL INFORMATION 1 |
| N+1 ⋮ N+9 | NORMAL TIME CODE |
| N+10 | SPECIAL INFORMATION 2 |
| N+11 ⋮ N+19 | NORMAL TIME CODE |
| N+20 | SPECIAL INFORMATION 3 |
| N+21 ⋮ | NORMAL TIME CODE |

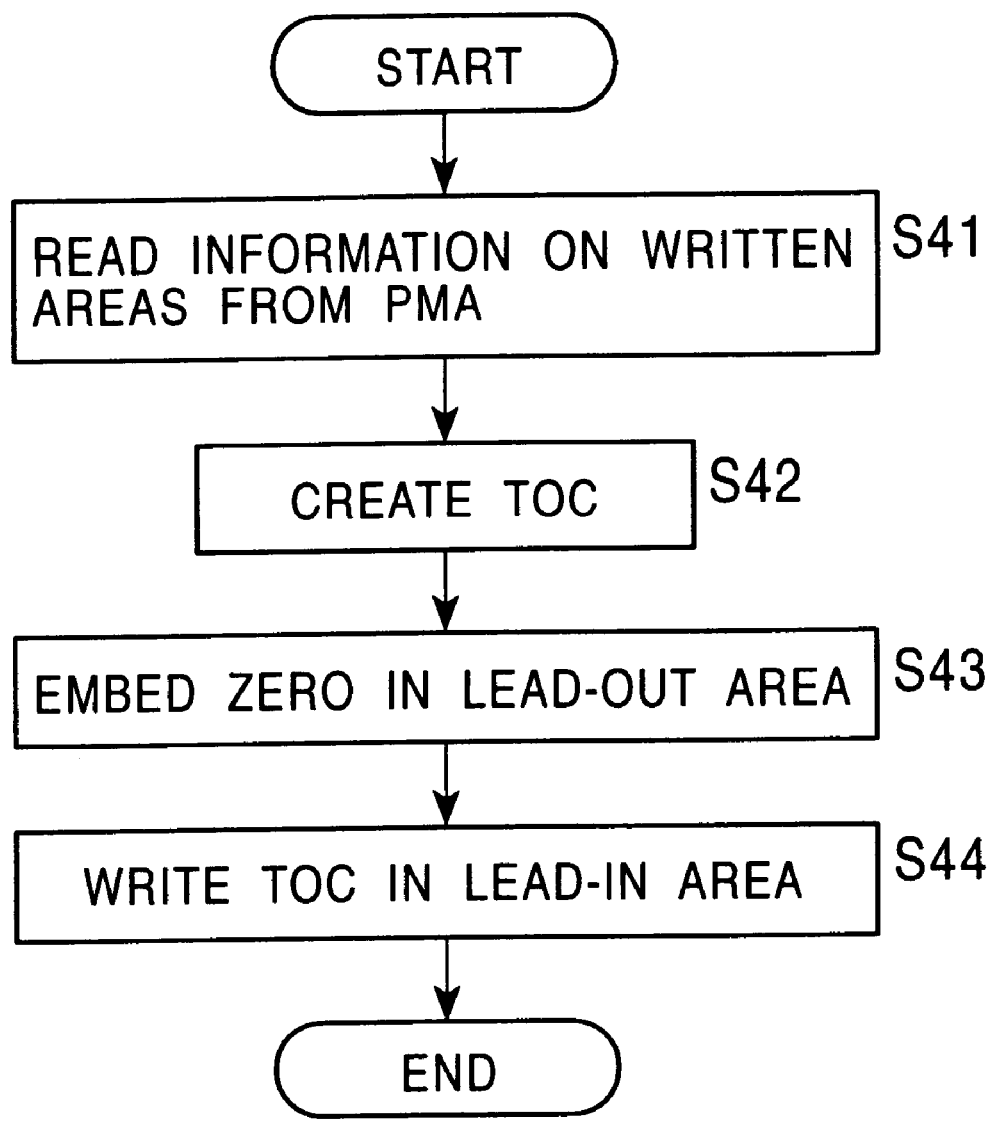

OPTICAL RECORDING APPARATUS AND METHOD FOR DISPLAYING RESIDUAL SPACE ON OPTICAL RECORDING MEDIUM

CROSS-REFERENCE TO RELATED APPLICATIONS

This application claims priority from Japanese Application No. P2000-175886 filed Jun. 12, 2000, the disclosure of which is hereby incorporated by reference herein.

BACKGROUND OF THE INVENTION

The present invention relates to optical recording apparatus, and more particularly relates to an optical recording apparatus capable of displaying information indicating whether a session is closed so that a CD-ROM drive can read data recorded on a recording medium using laser light. Also, the present invention relates to an optical-recording-medium residual-space displaying method for displaying the residual space on a recording medium on a display unit.

Disk-shaped recording media which utilize optical mark reading (hereinafter referred to as optical disks), such as compact disks (CDs), have a large storage capacity and can be accessed randomly. Since optical mark reading is contactless, it does not involve risks such as head crashes and abrasion and damage caused by reading, as compared with contact type recording media such as magnetic tapes. Because the surface of a disk is robust, the risk of accidentally losing data is low. Accordingly, optical disks have many advantages and are suitable as computer peripheral memory and recording media in which data can be created and stored reliably.

Recently, read-write apparatus which utilize a so-called CD-R (compact disk-recordable), which is a write-once optical disk, have been developed. Among CD-R's, there is one type of CD-R in which data is easily written in accordance with all standard formats used in compact disks such as CD-ROM (compact disk read only memory), CD-ROM/XA (CD-ROM extended architecture), CD-I (compact disc interactive), and CD-DA (compact disk digital-audio). In order to obtain the above-described advantages, in place of conventional magnetic tapes and magnetic disks, CD-R's are installed in electronic apparatus and used as media from and/or to which data is read and/or written.

Since data to be recorded is written to a CD-R in an incremental manner, table of contents (TOC) information, which is recorded on the inner perimeter of a CD-ROM or the like, cannot be written when the CD-R is still in a recordable state.

In other words, a session is not closed or finalized until a proper amount of data is written to the CD-R. When the session has been closed, the TOC information, which is index information for the recording medium, is written.

When a session is not closed, that is, when the CD-R is in a recordable state, the start position for writing data and the recorded position for reading data can be detected by referring to a provisional TOC written in a program memory area (PMA) of the recording medium. Because a CD-ROM drive cannot read the provisional TOC written in the PMA, the CD-ROM drive cannot read a write-once recording medium until a session on the recording medium has been closed. In order to enable the CD-ROM drive to read the write-once recording medium, it is necessary to close the session.

FIG. 13 is a flowchart showing a process of closing a session by a conventional recording.

In response to an instruction by the user to close a session, in step S41, the process reads information concerning written areas including the session's provisional TOC from a PMA on a recording medium.

In step S42, the process creates a normal TOC based on the information in the written areas. In step S43, the process embeds zero in a lead-out area.

In step S44, the process writes the normal TOC in a lead-in area. When the writing is completed, the session closing is completed.

Concerning a recording medium in which session closing is performed, there are a portion which is readable by a CD-ROM drive in which one or more sessions are closed and an unreadable portion in which a session is not closed. When the residual space of the recording medium is displayed, no distinction is made between the readable portion and the unreadable portion.

When the residual space on a recording medium is simply displayed in this manner, it is impossible to determine whether the recording medium is readable by a CD-ROM drive. A digital still camera and a read-write system which use the recording medium and the CD-ROM drive are required to separately have a function for checking information concerning session closing. Thus, operation of the digital still camera and the read-write system becomes complicated.

SUMMARY OF THE INVENTION

Accordingly, it is an object of the present invention to provide an optical recording apparatus which enables a user to recognize, by looking at a display, whether a session has been closed, thus assisting the user in determining whether to perform session closing. Another object of the present invention is to provide an optical-recording-medium residual-space displaying method which enables a user of an optical recording apparatus to recognize, by looking at a display, whether a session has been closed, thus assisting the user in determining whether to perform session closing.

According to an aspect of the present invention, the foregoing objects are achieved through provision of an apparatus for optically recording data on a recording medium which includes a write unit operable to write data to the recording medium. A session closing unit performs a session closing operation with respect to the data written to the recording medium, thereby enabling a reading apparatus to read information written to the recording medium by the write unit. A display unit displays information concerning the session closing operation, and a controller causes the display unit to display the information concerning session closing based on whether the session closing operation has been performed.

In the optical recording apparatus, the controller causes the display unit to display the information concerning session closing with respect to the information written to the recording medium by the write unit.

The controller may detect the residual space on the recording medium and create residual-space information based on the residual space. The residual-space information and the information concerning session closing may be displayed. An icon representing an integrated combination of the information concerning session closing and the residual-space information may be displayed.

The display unit may display an icon representing a ratio of the space of the recording medium occupied by at least one closed session to the residual space.

The display unit may display an icon representing a ratio between at least one closed session and an unclosed session from among the information written to the recording medium, the icon distinguishing the display of the ratio from the display of the residual space information.

According to another aspect of the present invention, the foregoing objects are achieved through provision of a method for displaying the residual space on a recording medium on which data has been optically recorded. The method includes performing a session closing operation to enable data written to the recording medium to be read; creating information concerning the session closing operation based on whether the session closing operation has been performed; detecting a residual space on the recording medium based on the amount of the information written to the recording medium; creating residual space information based on the residual space; and displaying the information concerning session closing and the residual-space information.

The display step may display the residual space information and the information concerning session closing with respect to the information written to the recording medium.

The display step may display an icon representing a ratio of the space of the recording medium occupied by at least one closed session to the residual space.

The display step may display an icon representing a ratio between at least one closed session and an unclosed session from among the information written to the recording medium, the icon distinguishing the display of the ratio from the display of the residual space information.

According to the present invention, it is possible to enable a user to recognize, by looking at a display, whether session closing has been performed, thus assisting the user in determining whether to perform session closing.

BRIEF DESCRIPTION OF THE DRAWINGS

FIG. 7 illustrates the frame structure of absolute time in pregroove (ATIP) information written in a lead-in area of the recording medium used in the digital still camera;

FIG. 13 is a flowchart showing a process of closing a session.

DETAILED DESCRIPTION

The present invention will become apparent from the following description of the preferred embodiment with reference to the accompanying drawings.

Figure 1:
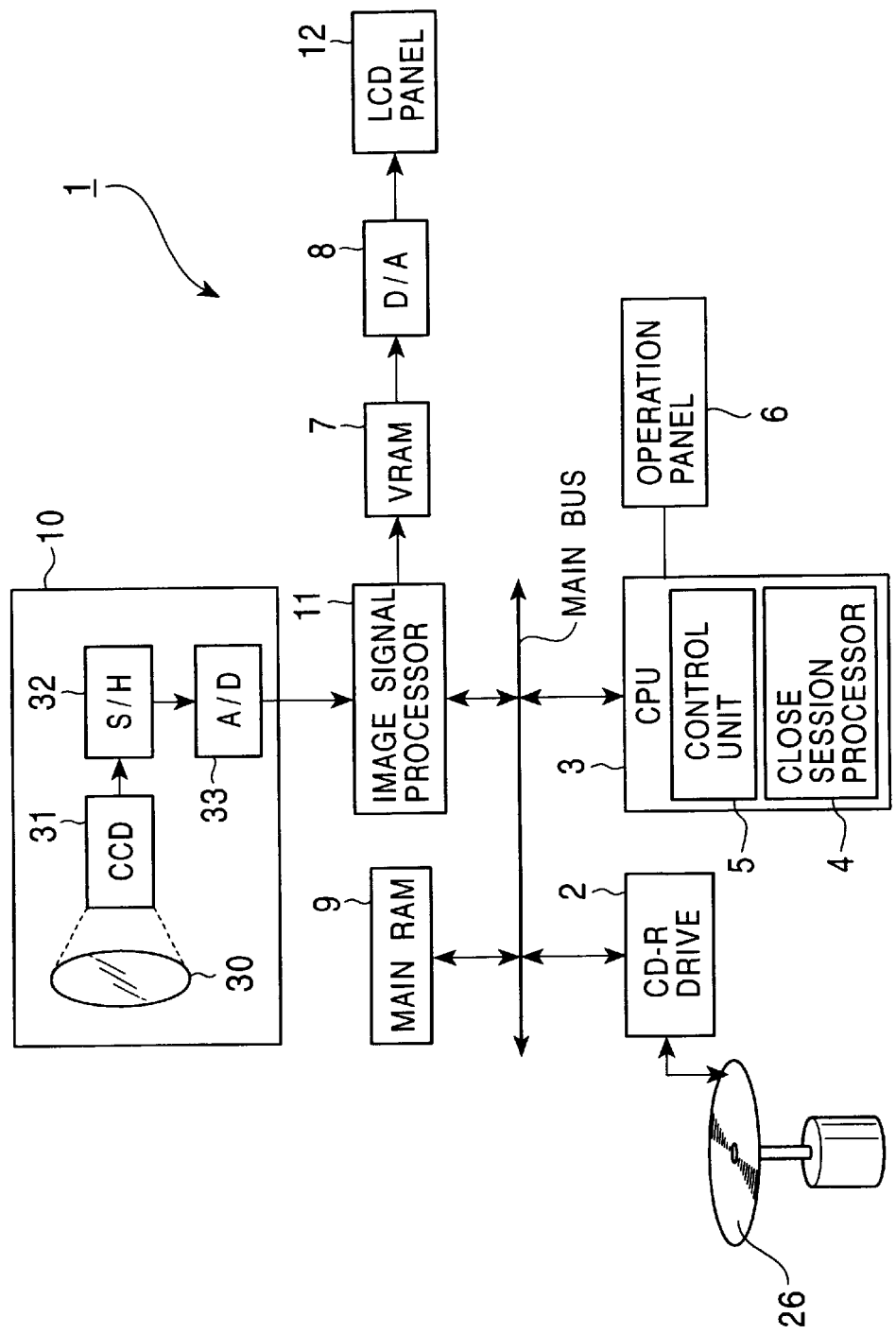
FIG. 1 is a block diagram of the structure of a digital still camera according to an embodiment of the present invention.

FIG. 1 shows a digital still camera 1 according to an embodiment of the present invention. The digital still camera 1 writes captured image data to and reads image data from a write-once recording medium. Specifically, the digital still camera 1 uses a disk-shaped CD-R 26.

The digital still camera 1 includes a CD-R drive 2 for writing data to the CD-R 26; a close session processor 4 for performing session closing which enables a CD-ROM drive, which is only capable of reading data, to read information written by the CD-R drive 2 to the CD-R 26; a liquid crystal display (LCD) panel 12 which is a display unit for displaying information concerning session closing performed by the close session processor 4; and a control unit 5 for causing the LCD panel 12 to display the information concerning session closing, which is information concerning whether session closing has been performed by the close session processor 4. The close session processor 4 and the control unit 5 are functional blocks indicating functions performed by a central processing unit (CPU) 3. The CPU 3 includes a program memory and a static random access memory (SRAM) which is used as a work area (none of which are shown). The program memory stores a close session processing program for performing session closing and an optical-recording-medium residual-space displaying program. The CPU 3 fetches and executes the close session processing program and the optical-recording-medium residual-space displaying program from the program memory while using the SRAM as a work area. The close session processing program is described in FIG. 13. The optical-recording-medium residual-space displaying program will be described hereinafter. The CPU 3 is connected to the CD-R drive 2 through a main bus.

The digital still camera 1 includes an image pickup unit 10 for capturing an image of a subject. An image signal processor 11 for converting an image signal from the image pickup unit 10 is connected to the image pickup unit 10. The image signal processor 11 is connected to the CPU 3 through the main bus. A video random access memory (VRAM) 7 is connected to the image signal processor 11. A digital-analog (D/A) converter 8 is connected to the VRAM 7. The LCD panel 12 is connected to the D/A converter 8.

A main RAM 9 is connected to the main bus. Data which undergoes conversion by the image signal processor 11 is stored in the main RAM 9. An operation panel 6 is connected to the CPU 3.

Based on a file system in compliance with the Universal Disk Format (UDF), the digital still camera 1 writes captured image data to and reads image data from a write-once recording medium (i.e., in this case, the CD-R 26).

The UDF is one definition for writing character codes of a file name and file attributes which are available for various media such as a CD-R, WORM (write-once read-many optical disk), CD-R/RW (compact disk-recordable/rewritable), MO (magneto-optical disk), and DVD (digital versatile disk). The UDF is endorsed by the Optical Storage Technology Association (OSTA). In other words, the UDF is a system in which data can be written by any operating system (OS) and written files can be compatibly read by any OS without using a special reader program.

In the UDF, a file entry information control block (ICB) is used as the main data structure. In the UDF, all files and directories have a unique ICB. In this embodiment, a file which stores actual data such as image data for a captured image is generally written prior to the ICB which defines the file. When a file is stored in a plurality of extents (data streams), a list of extents is included in the ICB.

In the UDF, a mapping table which is referred to as a virtual allocation table (VAT) is used to allocate a sequential number (virtual address) to each file so that it is possible to make a virtual reference. In a file system in compliance with the international standard ISO 9660, each file or each directory on a recording medium is directly referred to by a logical address. In contrast, in the UDF, each file or each directory is referred to by the above-described virtual address. The VAT can be placed at any position on a track, and the VAT can be referred to by a VAT ICB which indicates the position of the VAT.

In the UDF, it is defined that the VAT ICB is placed at a last-recorded physical address on the recording medium. Although the VAT is divided and placed on a plurality of extents, the VAT ICB includes a VAT extent list. In the UDF, when a file is modified in one way or another, it is not necessary to change the entirety of a series of file pointers. It is necessary to only change the VAT ICB in order to arrive at the changed file.

In the file system in compliance with the UDF, a seeking process enables a sequentially writable recording medium to be handled as if it were a random access readwrite recording medium.

Figure 2:
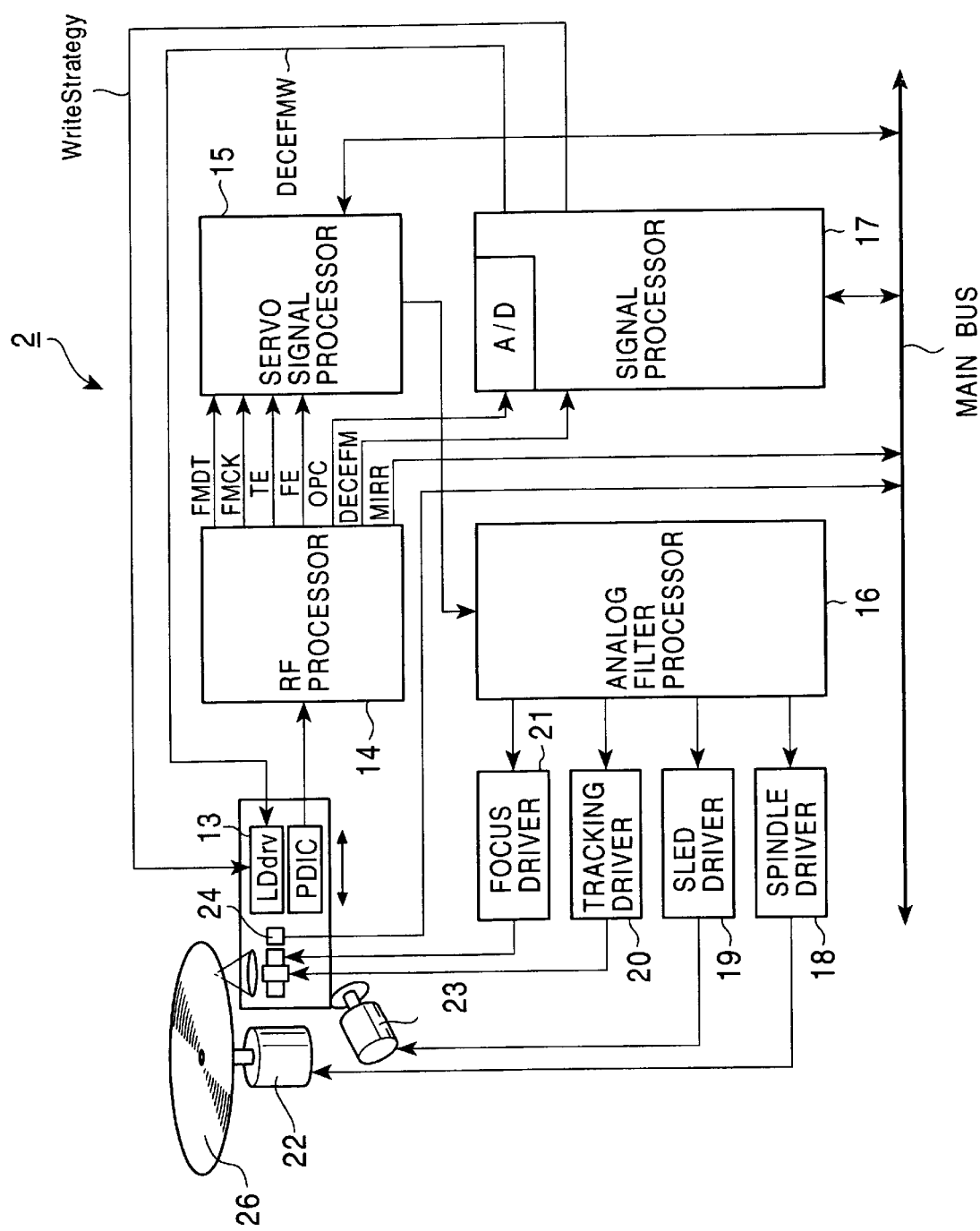
FIG. 2 is a block diagram of the detailed structure of a CD-R drive in the digital still camera.

Referring now to FIG. 2, the CD-R drive 2 includes an optical pickup (OP) 13 for reading data from and/or writing data to the CD-R 26; a radio frequency (RF) processor 14 for RF-processing the read signal; a servo signal processor 15 for generating a servo signal based on each signal from the RF processor 14; an analog filter processor 16 for generating an analog signal for controlling each driver based on the signal from the servo signal processor 15; a signal processor 17 for processing the read signal from the CD-R 26; a spindle driver 18 for controlling the rotation of a spindle motor 22; a sled driver 19 for controlling the operation of a sled motor 23; a tracking driver 20 for rocking an objective lens in the OP 13; a focus driver 21 for controlling the focus of a beam by vertically moving the objective lens in the OP 13 with respect to the CD-R 26; the spindle motor 22 for driving the CD-R 26; the sled motor 23 for moving the OP 13 in the radial direction of the CD-R 26; and a temperature sensor 24 for detecting temperature around the OP 13. The digital camera 1 writes captured image data to and reads image data from the CD-R 26.

The OP 13 includes the objective lens, a laser diode (LD), a laser diode driver, a photodetector IC, a half mirror, and the like. The OP 13 detects an optical signal and outputs the optical signal to the RF processor 14. The OP 13 writes data to the CD-R 26 based on a decoded eight to fourteen modulation for write (DECEFMW) signal output from the signal processor 17 for flashing and driving the laser, which is necessary for pit formation, an optimum power control (OPC) signal (write strategy) indicating the optimum value of the laser intensity, and the like.

The RF processor 14 samples and holds eight system signals consisting of a beam signal, side, and main, and performs arithmetic processing to generate signals such as a focus error (FE) signal, a tracking error (TE) signal, a mirror (MIRR) signal, an absolute time in pregroove (ATIP) signal, and a main read signal based on predetermined signals from among the eight system signals. From among the generated signals, the RF processor 14 outputs frequency modulation data (FMDT), a frequency modulation clock (FMCK), TE, and FE to the servo signal processor 15. The RF processor 14 outputs the OPC signal indicating the optimum value of the DECEFMW signal for flashing and driving the laser, which are detected by test writing, to the signal processor 17. The RF processor 14 outputs the MIRR to the CPU 3.

The servo signal processor 15 receives the FMDT, FMCK, TE, and FE from the RF processor 14. Under the control of the control unit 5, the servo signal processor 15 generates signals for controlling various servos inherent in optical disks and outputs the signals to the analog filter processor 16.

The analog filter processor 16 generates analog signals based on the control signals for various servos, which are output from the servo signal processor 15, and outputs the analog signals to the spindle driver 18, the sled driver 19, the tracking driver 20, and the focus driver 21.

Under the control of the CPU 3, the signal processor 17 receives the OPC and DECEFMW from the RF processor 14 and performs processing such as cross interleaved Reed-Solomon code (CIRC) decoding and encoding, write strategy, ADDr decoding, asymmetry computation, running OPC, and the like. When writing data to the CD-R 26, the signal processor 17 outputs the DECEFMW signal for flashing and driving the laser, the OPC signal indicating the optimum value of the laser intensity, and the like to the OP 13.

Based on the signal from the analog filter processor 16, the spindle driver 18 controls the rotation of the spindle motor 22. Based on the signal from the analog filter processor 16, the sled driver 19 controls the sledding movement of the sled motor 23.

Based on the signal from the analog filter processor 16, the tracking driver 20 rocks the OP 13 and controls the position of a beam irradiation spot on the disk surface of the CD-R 26. Based on the signal from the analog filter processor 16, the focus driver 21 moves the OP 13 vertically with respect to the disk surface of the CD-R 26, thereby performing focus control of the laser.

Based on the signal from the spindle driver 18, the spindle motor 22 rotates the CD-R 26. Based on the signal from the sled driver 19, the sled motor 23 causes the OP 13 to sled.

The temperature sensor 24 is placed near the OP 13 and detects temperature around the CD-R 26. The temperature sensor 24 converts the detected temperature into a signal indicating the temperature and supplies the signal to the CPU 3.

The CPU 3 connects the program memory which stores the close session processing program and the optical-recording-medium residual-space displaying program with the SRAM which temporarily stores the VAT ICB and various data and which is used as a work area. By executing the corresponding programs, the CPU 3 functions as the close session processor 4 and the control unit 5. In addition, the CPU 3 has a function of controlling the CD-R drive 2. The temperature sensor 24 inputs a signal which indicates the temperature to the CPU 3, and the CPU 3 in turn gives an instruction to perform test writing if temperature variation exceeds a predetermined value. When data is written a predetermined number of times, the CPU 3 gives an instruction to perform test writing.

The image pickup unit 10 includes a lens 30 for capturing an image of a subject; a charge coupled device (CCD) 31 for generating an image signal; a sampling/holding (S/H) circuit 32; and an A/D converting circuit 33 for converting an image signal into a digital signal. The CCD 31 generates an image signal based on an image of a subject from the lens 30 and supplies the generated image signal to the S/H circuit 32. The S/H circuit 32 samples and holds the image signal from the CCD 31 and supplies the image signal to the A/D converting circuit 33. The A/D converting circuit 33 converts the image signal from the S/H circuit 32 into a digital signal and supplies the digital signal to the image signal processor 11.

Under the control of the CPU 3, the image signal processor 11 performs image processing of the digital signal from the image pickup unit 10. Specifically, the image signal processor 11 performs color conversion from RGB signals into color-difference and chrominance signals, white balance processing, γ correction, reduced image processing, JPEG compression, and the like. The processed image signal is stored in the main RAM 9 and subsequently supplied to the signal processor 17. The image signal processor 11 supplies the processed image signal to the LCD panel 12 through the VRAM 7 and the D/A converter 8. The LCD panel 12 displays the image signal supplied from the image signal processor 11 through the VRAM 7 and the D/A converter 8.

In the digital still camera 1, image data written by the CD-R drive 2 to the CD-R 26 can be read by a CD-ROM drive (not shown) when a session which contains the written image data is closed by the close session processor 4 of the CPU 3. Subsequently, the image data can be displayed on, for example, a display unit connected to the CD-ROM drive.

As described above, data is incrementally recorded on CD-R's. When a CD-R is still in a recordable state, TOC information, which is written on the inner perimeter of a disk such as a CD-ROM, is not written.

When a CD-R is in a state in which session closing has not yet been performed, that is, when the CD-R is still in a recordable state, the start position for writing data and the recorded position for reading data are detected by referring to a provisional TOC written in a program memory area (PMA) of the recording medium. A CD-ROM reading apparatus, i.e., a CD-ROM drive, cannot read the provisional TOC written in the PMA, and hence it is impossible for the CD-ROM drive to read a write-once recording medium having an unclosed session. In order to enable the CD-ROM drive to read a write-once recording medium, it is necessary to perform session closing.

In the digital still camera 1, a session containing image data written by the CD-R drive 2 to the CD-R 26 is closed by the CPU 3 by fetching and executing the close session processing program from the program memory, and hence a CD-ROM drive can read the image data. Here, the CPU 3 operates as the close session processor 4. The process of closing a session is described with reference to FIG. 13.

Figure 3:
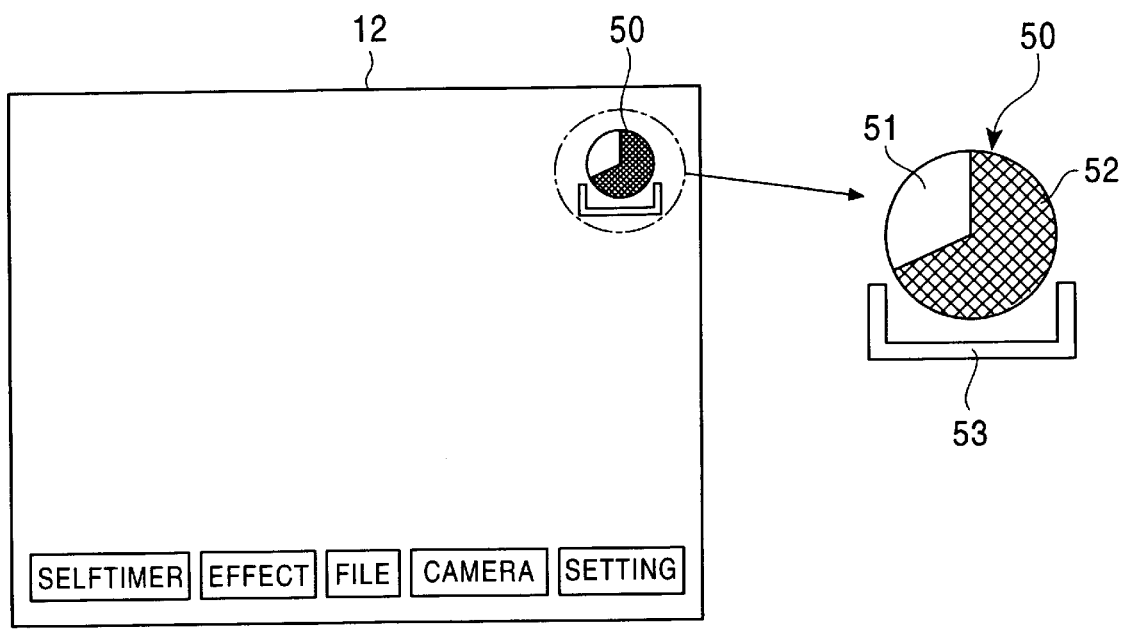
FIG. 3 illustrates an example of a residual-space indicator in which a symbol which denotes a closed session is additionally displayed.
Figure 4:
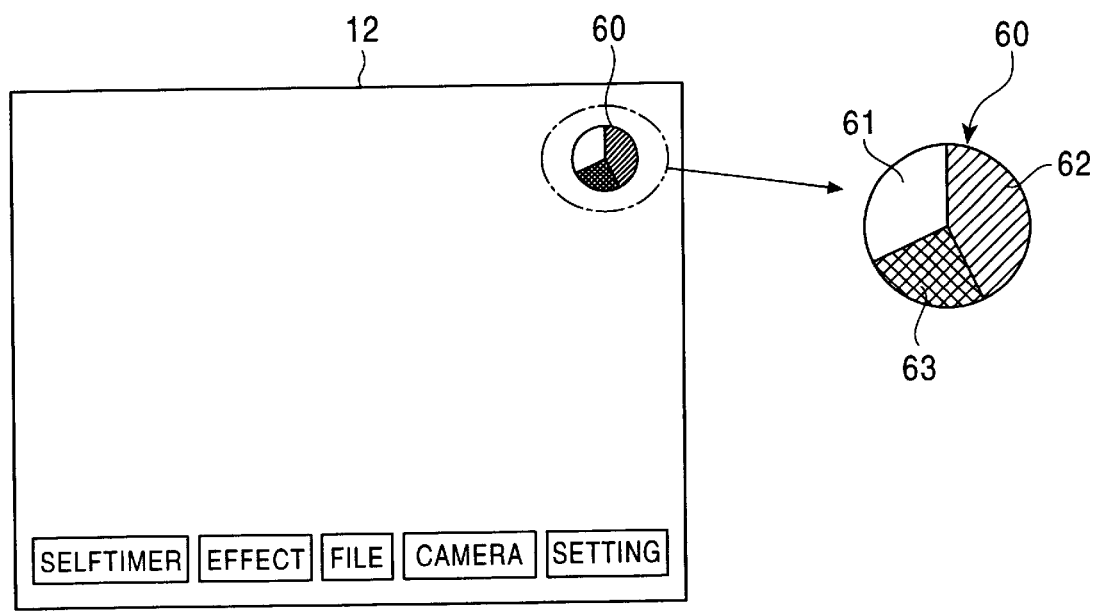
FIG. 4 illustrates an example in which a residual-space indicator and a symbol which denotes a closed session are integrated with each other.

In the digital still camera 1, the CPU 3 fetches and executes the optical-recording-medium residual-space displaying program from the program memory. As shown in FIGS. 3 and 4, the CPU 3 causes the LCD panel 12 to display information concerning session closing based on whether or not session closing has been performed. Here, the CPU 3 operates as the control unit 5.

The displayed information is a graphical indicator which helps a user recognize, by looking at the indicator, the ratio of free space to the entire disk space of a recording medium. In the indicator, a portion in which one or more sessions are closed is highlighted so that it is clearly recognizable. Accordingly, it is convenient for the user to simultaneously see information indicating the ratio of free space to the entire disk space and information indicating whether there is a closed session which can immediately be read by a CD-ROM drive.

Referring to FIG. 3, in the upper right corner of the LCD panel 12, an icon 50 is displayed in which a sector 51 indicating residual space and a sector 52 indicating used space are integrally displayed. An indicator 53 which denotes that a session closing has already been performed is also displayed.

Referring to FIG. 4, in the upper right corner of the LCD panel 12, an icon 60 is displayed in which a sector 61 indicating residual space, a sector 62 indicating a portion containing one or more closed sessions, and a sector 63 indicating used space which contains an unclosed session are integrated with one another. In other words, the indicator which denotes that a session closing has been performed and the residual-space indicator are integrated with each other. This example will be described hereinafter.

Figure 5:
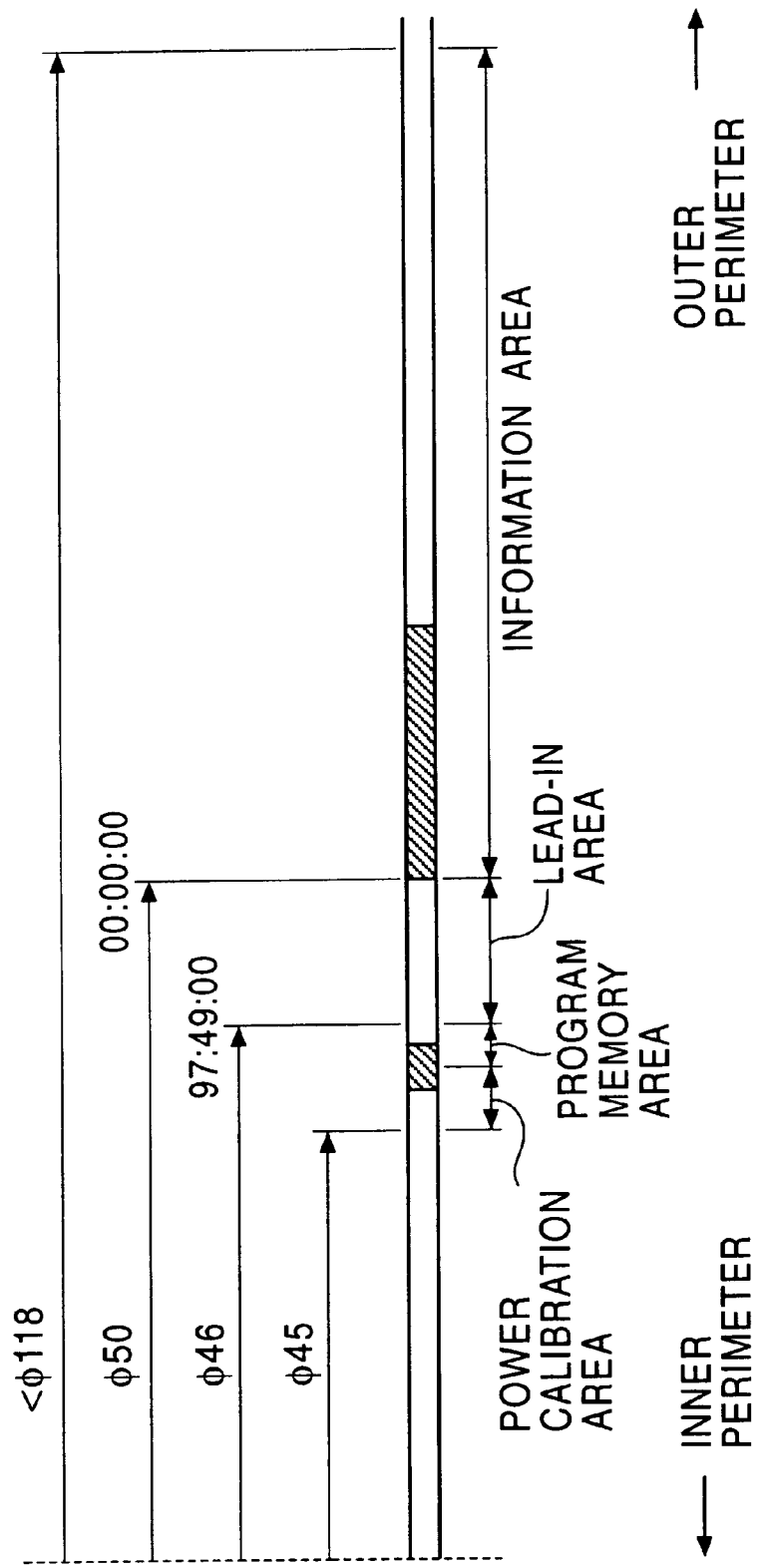
FIG. 5 is a partial cross-sectional view of the recording medium used in the digital still camera.
Figure 6:
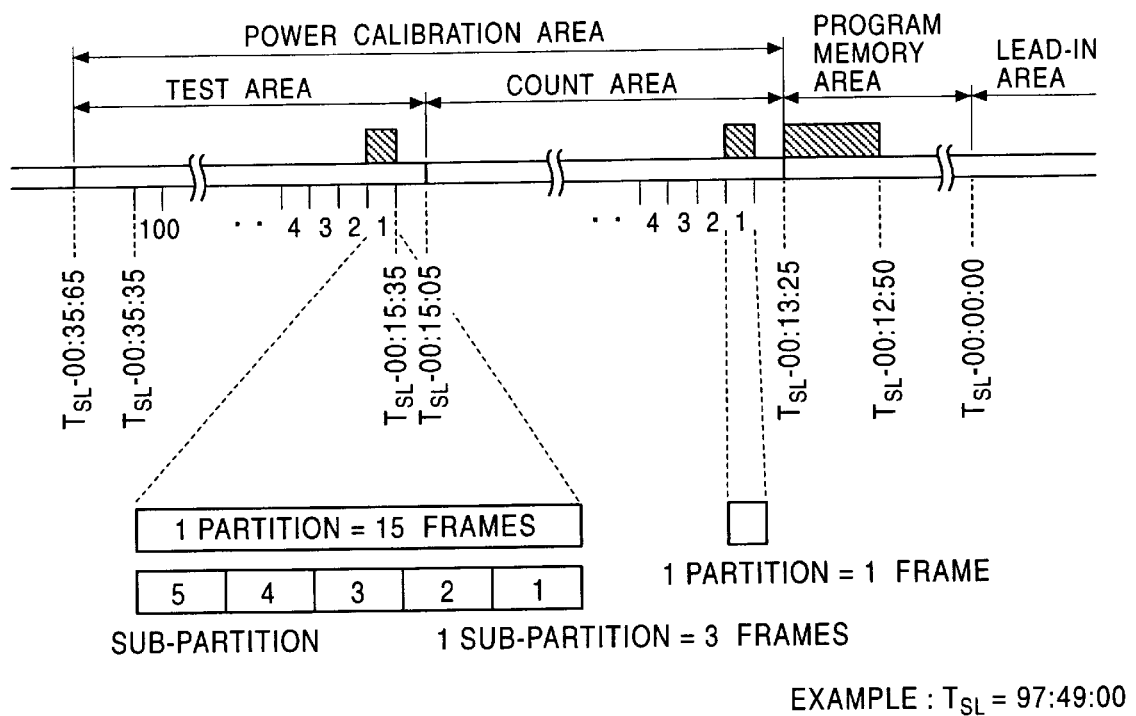
FIG. 6 is a format diagram showing an enlarged view of the cross-section shown in FIG. 5.

As described above, data can be read from or written to the CD-R 26, which is a write-once recording medium, based on a file system in compliance with the UDF. FIGS. 5 and 6 show cross-sections of the CD-R 26. FIG. 5 is a partial vertical cross-sectional view of the CD-R 26 with respect to the disk surface. FIG. 6 shows an enlarged view of the inner perimeter side of the cross-sectional view shown in FIG. 5.

Referring to FIG. 5, the CD-R 26 includes a power calibration area (PCA), a program memory area (PMA), a lead-in area, and an information area.

Referring to FIG. 6, the power calibration area includes a test area for actually performing test writing and a count area for counting the start position of test writing and the number of times test writing has been performed.

The test area is divided into 100 partitions. Each partition is designated by relative time from the start time of the lead-in area. Each partition is divided into a minimum of one sub-partition or a maximum of fifteen sub-partitions, if necessary. By utilizing the sub-partitions, test writing is performed immediately before writing, and hence the laser output is adjusted.

The operation of the digital still camera 1 will now be described. Specifically, the digital still camera 1 performs a preparation process, an image capturing process, a reading and displaying process, and a close-session information and residual-space information creating and displaying process.

Figure 8:
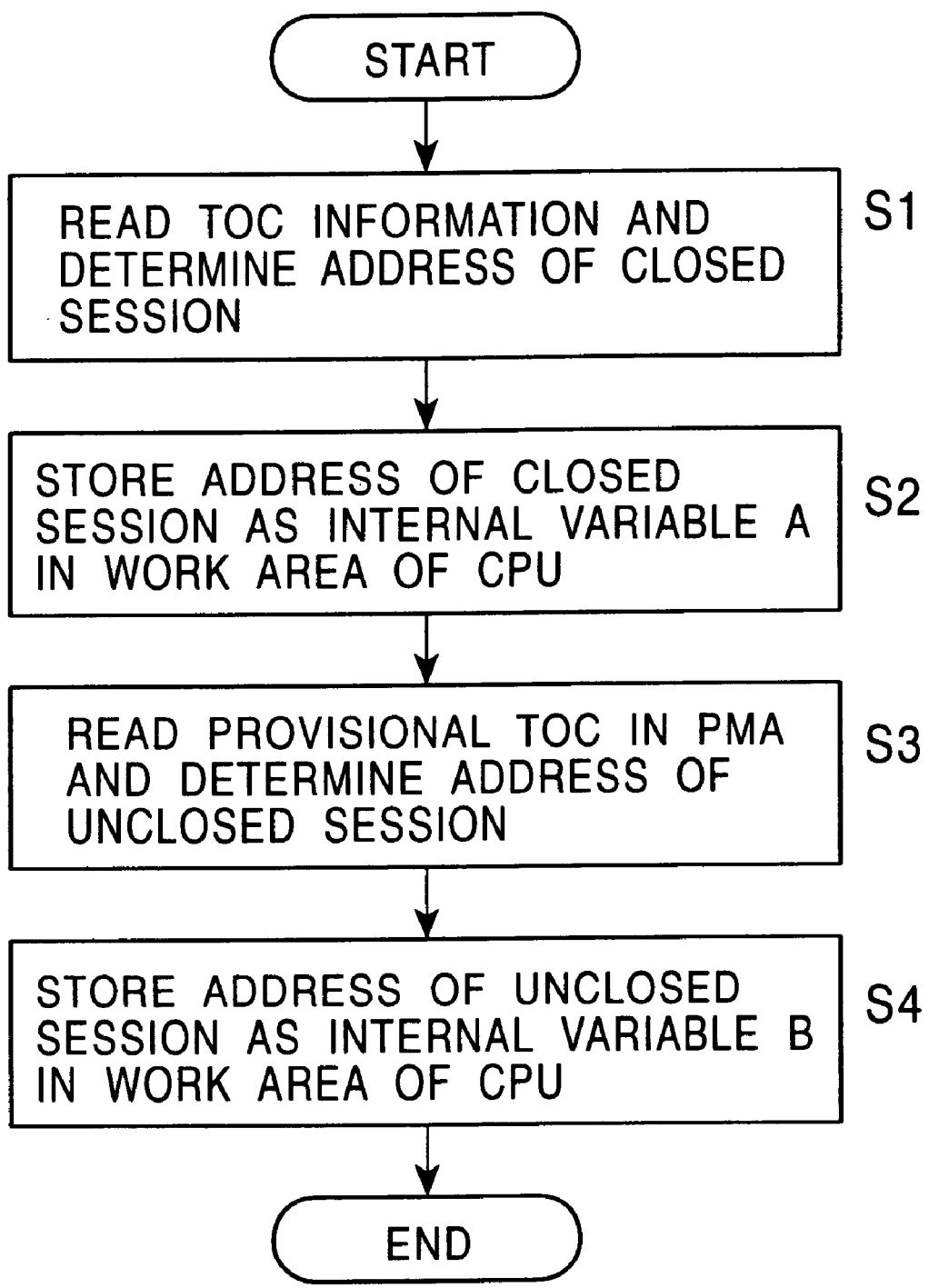
FIG. 8 is a flowchart showing a preparation process performed by the digital still camera.

Referring to FIGS. 7 and 8, the preparation process is described. The preparation process is performed by the CPU 3. The OP 13 is moved to an arbitrary position in a lead-in area. The process starts with determining the address of a session closed by the close session processor 4 and the address of an unclosed session. FIG. 7 shows the frame structure of the ATIP written in the lead-in area. In a frame with the frame number N, special information 1 is written. In a frame with the frame number (N+10), special information 2 is written. In frames with the frame numbers (N+1) to (N+9) subsequent to special information 1 and in frames with the frame numbers (N+11) to (N+19) subsequent to special information 2, normal time codes are written.

In each special information area which is written every ten frames, the start position of the lead-in area of the CD-R 26 is written as time information. In special information 2 area with the frame number (N+10), which is to be read in this example, the start position of the lead-in area is written as time information in a predetermined format.

For example, when the lead-in area starts at a position at which 2 minutes and 11 seconds have elapsed since the recording start point of the CD-R 26, a digital signal of time information indicating 97 minutes and 49 seconds, which is obtained by subtracting 2 minutes and 11 seconds from total recording time of 100 minutes, is written in the special information 2 area of the CD-R 26. In other words, time information "97:49:00" is written as "1001 0111 0100 1001 0000 0000".

The information written in the special information area corresponds to an identification code for identifying a recording medium. For example, the above-described time information is used as a manufacturer product code of a recording medium.

A recording-medium reading apparatus stores in advance a table indicating the relationship between a write strategy parameter which corresponds to the identification code and other related parameters. A write strategy is a correction parameter for adjusting the duration and level of a write laser pulse for each pit so that the pit size after the writing is in accordance with the standard. The reading apparatus is provided in advance with a write strategy for each recording medium.

The preparation process performed by the CPU 3 will now be described. Immediately after turning on the digital still camera 1, the CPU 3 moves the OP 13 in the CD-R drive 2 to an arbitrary position in a lead-in area of a first session which is in the innermost perimeter of the CD-R 26 and reads TOC information and pointer information to the next session. Based on the pointer information, the CPU 3 reads TOC information in the next session and pointer information for the next session. When the CPU 3 arrives at the last session, the CPU 3 can determine the addresses of closed sessions and the address of an unclosed session. In the unclosed session, provisional TOC information is read from a corresponding PMA, and hence the last written address on the medium is determined. The CPU 3 uses this address when writing is performed later.

The preparation process will now be described with reference to FIG. 8. In step S1, the process starts reading the TOC in the lead-in area in the first session and thereafter reads the subsequent closed sessions one after another. In doing so, the process determines the address of each closed session. In step S2, the process stores the address of each closed session as an internal variable A in the SRAM which is a work area for the CPU 3.

In step S3, the process reads provisional TOC information from the PMA and determines the address of an unclosed session. In step S4, the process stores the address of the unclosed session as an internal variable B in the SRAM which is used as a work area for the CPU 3. When the processing in steps S1 to S4 has been performed, the preparation process is terminated.

The image capturing process will now be described. In the image capturing process, the close-session information and residual-space information displaying process is inserted. The two processes are described with reference to FIG. 9.

The CD-R drive 2 moves the OP 13 to an arbitrary position in the lead-in area shown in FIGS. 5 and 6 and reads ATIP information. The process extracts special information 2 from among the ATIP information and reads the manufacturer product code of the CD-R 26 at the start time of the lead-in area (step S11).

In step S12, the process uses the manufacturer product code or the like to select and set a suitable parameter from among parameters for writing optimization held at the CD-R drive 2 side. In step S13, the process sets a write strategy parameter and other writing characteristics.

In step S14, the process converts images from the CCD 31 into images having the resolution of the LCD panel 12 using the image signal processor 11, and writes the images to the VRAM 7. The images are sequentially displayed on the LCD panel 12. The processing performed in step S14 is described in detail. When the shutter is released by operating the operation panel 6, an image is optically captured through the lens 30 on the CDD 31. The CCD 31 outputs the image as an analog signal, and the S/H circuit 32 eliminates the clamp level and holds the signal. The A/D converting circuit 33 converts the signal into digital data and sends the digital data to the image signal processor 11. The image signal processor 11 performs auto white balance processing, color conversion from RGB to YUV, γ correction, and conversion into the other image data formats. The processed data is temporarily stored in the main RAM 9 via the main bus. At the same time, the image signal processor 11 converts the image into an image with the resolution of the LCD panel 12 and writes the converted image data to the VRAM 7. The LCD panel 12 displays the image. Alternatively, information concerning the image capturing process is displayed using a symbol or an icon, and such graphical information is combined with the converted image data to be displayed. The resulting data is transmitted to the VRAM 7, and the contents of the data are read when display is performed by the LCD panel 12. As a result, the LCD panel 12 can display the image.

Figure 10:
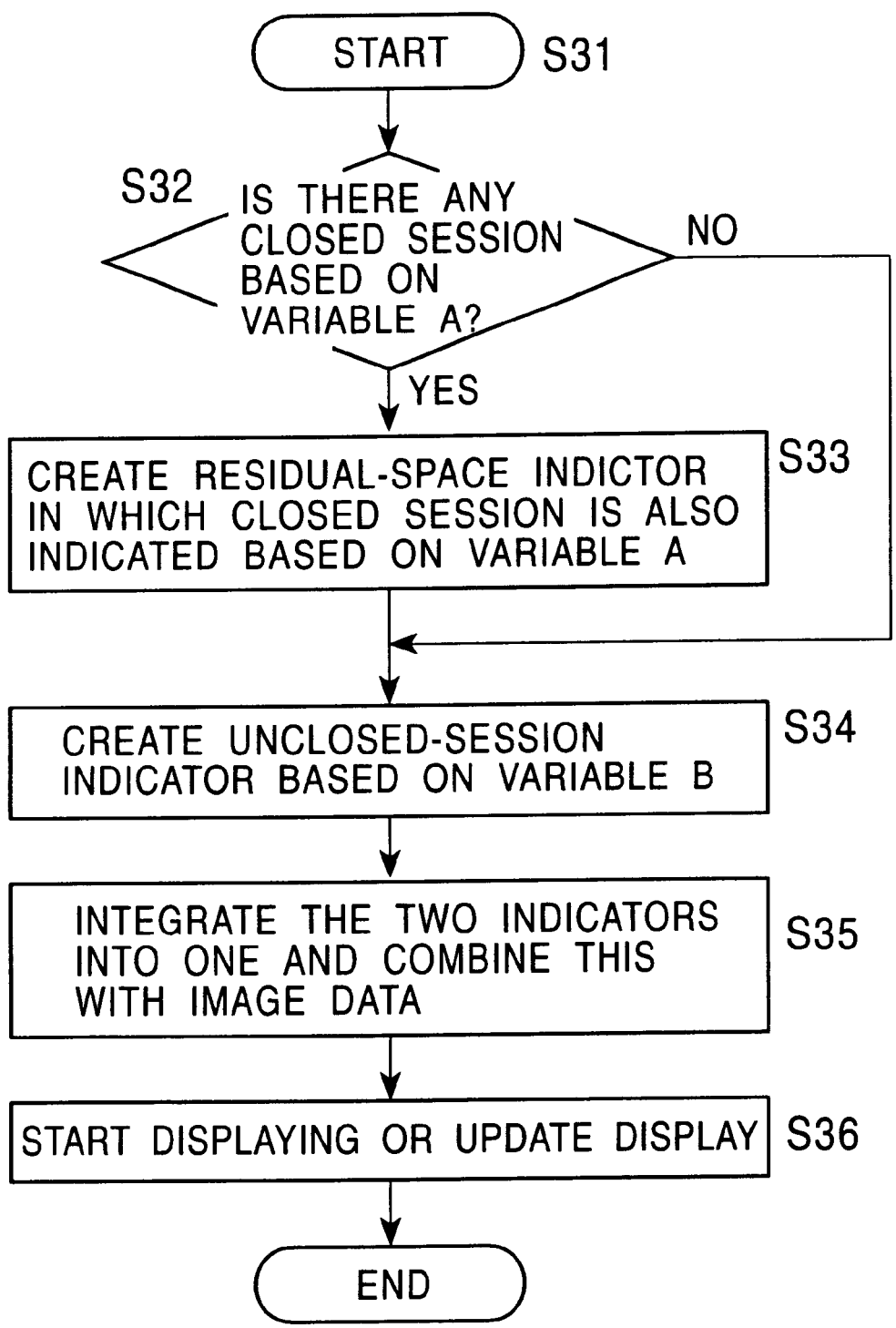
FIG. 10 is a flowchart showing a subroutine of the residual-space-indicator creating and displaying process shown in FIG. 9.

In step S15, the CPU 3 of the digital still camera 1 executes the optical-recording-medium residual-space displaying program. The CPU 3 operates as the control unit 5 and performs the residual-space-indicator creating and displaying process. This process is described with reference to FIG. 10. In step S32, the process reads the variable A stored in the SRAM of the CPU 3 and determines whether there is any closed session. If the determination is affirmative, in step S33, the process creates the residual-space indicator in which a closed session is also indicated based on the variable A. In step S34, the process reads the variable B, which is stored in the SRAM of the CPU in step S4 in FIG. 8, and creates an unclosed-session indicator. The processing in step S34 is also performed when the determination in step S32 is negative. In step S35, the control unit 5 integrates the two indicators which denote the closed session and the unclosed session, respectively, and combines the integrated indicator with the converted image data using the image signal processor 11. In step S36, the LCD panel 12 starts displaying the image or the displayed image is updated.

Figure 9:
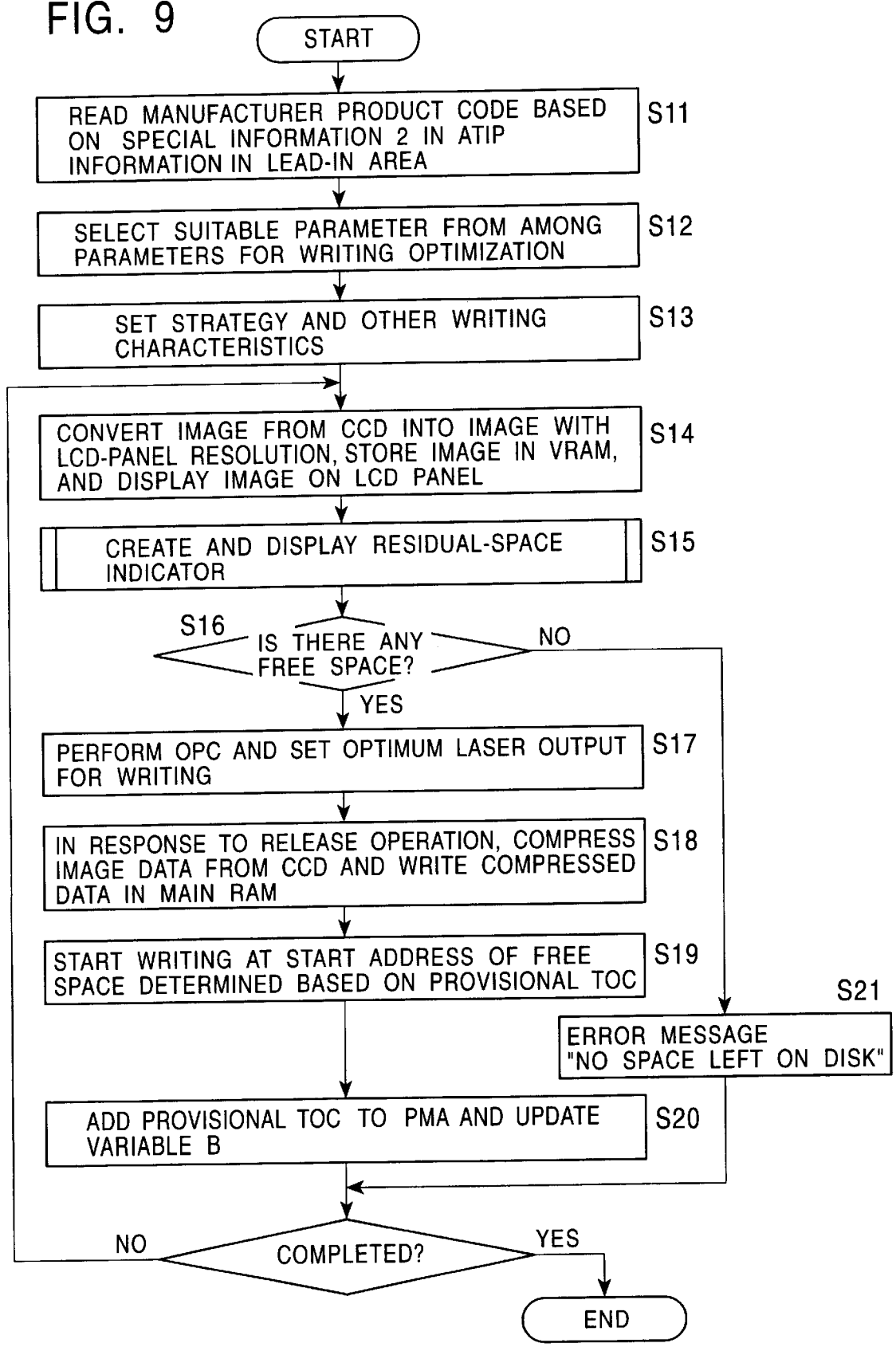
FIG. 9 is a flowchart showing an image capturing process performed by the digital still camera, and a residual-space-indicator creating and displaying process included therein.

In step S16 in FIG. 9, the process reads the PMA and determines whether there is any free space left on the recording medium. If the determination is affirmative, writing can be performed, and the process performs steps S17 to S20. In contrast, if there is no free space, the process displays, in step S21, an error message, such as "no space left on disk".

In step S17, the process performs the optimum power calibration (OPC) operation for determining the optimum value of the laser output. While the above-described write strategy is precise control of the laser for each pit, the OPC operation computes the optimum value of the laser output for the overall write operation. The OPC operation is performed in order to obtain a pit-writing preset value for achieving a desired value for ideal reading.

The OPC operation is performed in the test area of the PCA shown in FIG. 7. The test area is divided into 100 partitions, and each partition is designated by relative time from the start position of the lead-in area. Each partition is divided into a maximum of fifteen sub-partitions. When each partition is divided into the maximum number of sub-partitions, one sub-partition corresponds to one frame. By using one partition, test writing is performed prior to performing the actual writing. Hence, the laser output can be adjusted.

Specifically, the laser output is changed in a stepwise manner starting from a predetermined value, and writing to the CD-R 26 is performed step by step. The laser output is read, and an asymmetry value at each step is measured. Linear approximation is performed using a preset value in the vicinity of a desired asymmetry, and hence a preset value of the laser output which indicates the desired asymmetry value is obtained.

In step S18, in response to a releasing action input by the operation panel 6, the image data from the CCD 31 is compressed by the image signal processor 11 using a predetermined compression system, such as JPEG compression or MPEG compression (moving image), and the compressed image is written to the main RAM 9. In step S19, the process starts writing the image data, using the CD-R drive 2, at the start address of the free space determined based on the provisional TOC information, that is, starts writing at the last-read address of the medium. When writing has been completed, in step S20, the process adds the provisional TOC information to the PMA and updates the variable B. When it is determined in step S22 that the process has been completed, the process is terminated. If the determination is negative, the process is repeated from step S14 onward.

The reading and displaying process will now be described. When an image to be read is designated by the operation panel 6, the process reads image data from a predetermined portion of the CD-R 26 using the CD-R drive 2. The operation of the CD-R drive 2 includes reading a PMA, determining a physical address of the designated image data based on provisional TOC information, and starting reading of the data. The read data is transferred to the main RAM 9. When the image data is compressed, the image signal processor 11 decompresses the data. The image signal processor 11 converts the data into a display image with the resolution of the LCD panel 12. The image-capturing information, the close-session information, and information for displaying the residual space are displayed using symbols or icons, and they are combined with the image data to be displayed. The resulting data is transferred to the VRAM 7. The contents of the data are read when display is performed by the LCD panel 12, and the image is displayed.

Figure 11:
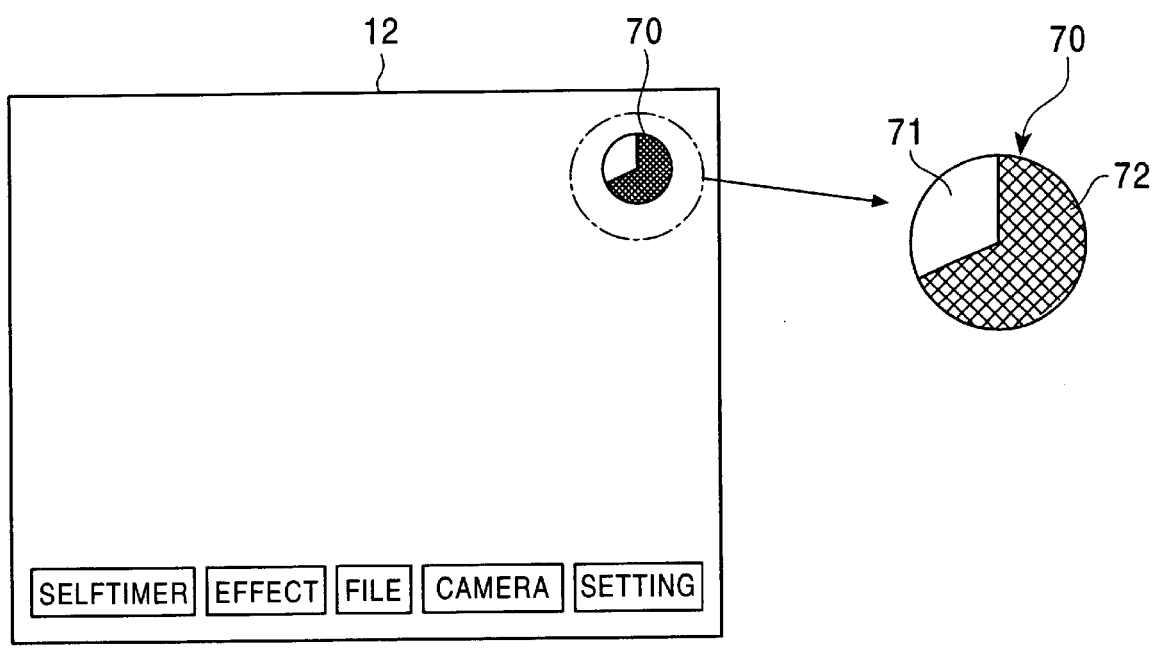
FIG. 11 illustrates an example of a residual-space indicator in which session closing has not been performed.
Figure 12:
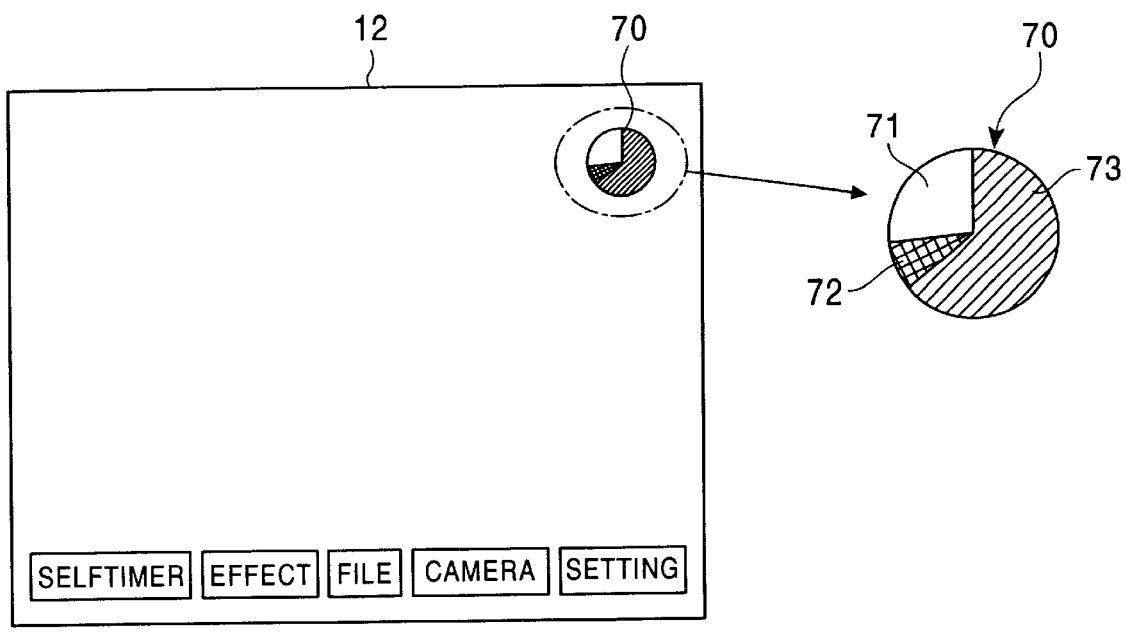
FIG. 12 illustrates an example of a residual-space indicator after session closing has been performed.

An example of displaying the close-session information and the residual-space information, which is performed in the image capturing and recording process and in the reading and displaying process, will now be described. Referring to FIGS. 11 and 12, an example is described which is similar to that described with reference to FIG. 4.

In this example, a residual-space icon 70 is always displayed in the upper right corner of the LCD panel 12. FIG. 11 shows a case before session closing has been performed. The residual-space icon 70 includes a sector 71 indicating free space on the CD-R 26 and a sector 72 indicating used space on the CD-R 26. FIG. 12 shows a case after session closing has been performed. The residual-space icon 70 includes the sector 71 indicating free space, a sector 73 indicating one or more closed sessions, and the sector 72 indicating a portion written after session closing has been performed.

Session closing is a process of converting data into a CD-ROM format. Session closing enables an apparatus such as a personal computer with a CD-ROM drive to read an image.

In a read (playback) operation, the digital still camera 1 is unconcerned about whether or not session closing has been performed. However, there are some cases in which it is necessary for the digital still camera 1 to determine whether part of a medium which is currently in use is readable by a CD-ROM drive. If it is possible to recognize the ratio of a closed-session portion to the entire used portion, it is more convenient for a user to determine at any time whether it is necessary to perform session closing.

The digital still camera 1 recognizes the address of a closed session, which is read by the preparation process, and the most recent address of an unclosed session based on provisional TOC information read from the most recent PMA. Accordingly, the digital still camera 1 can modify the indicator which denotes the close-session information and the residual-space indicator. By looking at the indicators, the user can determine whether there is any closed session, which is convenient for the user.

When closing a session, a large amount of data is to be recorded in a lead-in area and in a lead-out area. It is preferable that session closing should be performed only when an appropriate amount of data has been recorded, that is, at a moment which is not too early. Since the digital still camera 1 enables the user to recognize the ratio of a closed-session portion to the entire written portion by looking at the display, it becomes easy for the user to determine whether to perform session closing.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An apparatus for optically recording data on a recording medium, said apparatus comprising:

a write unit operable to write data to the recording medium when the recording medium is in a recordable state;

a session closing unit operable to perform a session closing at the termination of the recordable state to permit the data written to the recording medium during the session to be read;

a controller operable to detect space on the recording medium occupied by data of at least one closed session, to detect space on the recording medium occupied by data of an unclosed session, and to detect residual space on the recording medium based on the total amount of data written to the recording medium; and a display unit operable to display session closing information indicating whether at least one session closing has been performed;

said controller being further operable to generate the session closing information and to cause said display unit to display the session closing information, information in the residual space, and an icon representing a ratio of the space on the recording medium occupied by the data of the at least one closed session to the space on the recording medium occupied by the data of the unclosed session thereby providing an indication of whether session closing is to be performed on the data of the unclosed session.

2. An apparatus according to claim 1, wherein said controller is further operable to cause said display unit to display a further icon depicting the session closing information.

3. An apparatus according to claim 1, wherein said controller is further operable to cause said display unit to display an icon representing a ratio of the space on the recording medium occupied by the data of the at least one closed session to the residual space information.

4. A method for optically recording data on a recording medium, said method comprising:

- performing at least one session closing to terminate a recordable state during which data is written to the recording medium and to permit the written data to be read from the recording medium;
- generating session closing information indicating whether the at least one session closing has been performed;
- detecting space on the recording medium occupied by data of the at least one closed session;
- writing additional data to the recording medium during an unclosed session;
- detecting space on the recording medium occupied by the data of the unclosed session;
- detecting residual space on the recording medium based on the total amount of data written to the recording medium;
- generating residual-space information based on the residual space; and
- displaying the session closing information, the residual-space information and an icon representing a ratio of the space on the recording medium occupied by the data of the at least one closed session to the space on the recording medium occupied by the data of the unclosed session thereby providing an indication of whether a further session closing is to be performed on the data of the unclosed session.

5. A method according to claim 4, wherein said displaying step includes displaying a further icon depicting the session closing information.

6. A method according to claim 4, wherein said displaying step includes displaying an icon representing a ratio of the space on the recording medium occupied by the data of the at least one closed session to the residual space information.

7. A digital camera for optically recording data on a recording medium, said digital camera comprising:

- a write unit operable to write data to the recording medium when the recording medium is in a recordable state;
- a session closing unit operable to perform a session closing at the termination of the recordable state to permit the data written to the recording medium during the session to be read;
- a controller operable to detect space on the recording medium occupied by data of at least one closed session, to detect space on the recording medium occupied by data of an unclosed session, and to detect residual space on the recording medium based on the total amount of data written to the recording medium; and
- a display unit operable to display session closing information indicating whether at least one session closing has been performed;
- said controller being further operable to generate the session closing information and to cause said display unit to display the session closing information, information on the residual space, and an icon representing a ratio of the space on the recording medium occupied by the data of the at least one closed session to the space on the recording medium occupied by the data of the unclosed session thereby providing an indication of whether session closing is to be performed on the data of the unclosed session.

8. A digital camera according to claim 7, wherein said controller is further operable to cause said display unit to display a further icon depicting the session closing information.

9. A digital camera according to claim 7, wherein said controller is further operable to cause said display unit to display an icon representing a ratio of the space on the recording medium occupied by the data of the at least one closed session to the residual space information.

* * * * *